Jan. 18, 1955 E. N. MULLER 2,700,068

PULSE MULTIPLEX SYSTEM

Filed Nov. 16, 1948 5 Sheets-Sheet 1

Inventor:
Egon Nicolas Muller

Jan. 18, 1955 E. N. MULLER 2,700,068

PULSE MULTIPLEX SYSTEM

Filed Nov. 16, 1948 5 Sheets-Sheet 2

Inventor:
Egon Nicolas Muller

Jan. 18, 1955 E. N. MULLER 2,700,068

PULSE MULTIPLEX SYSTEM

Filed Nov. 16, 1948 5 Sheets-Sheet 3

Inventor:
Egon Nicolas Muller

Inventor:
Egon Nicolas Muller

Inventor:
Egon Nicolas Muller

United States Patent Office 2,700,068

Patented Jan. 18, 1955

2,700,068

PULSE MULTIPLEX SYSTEM

Egon Nicolas Muller, Esch (Alzette), Luxembourg

Application November 16, 1948, Serial No. 60,279

36 Claims. (Cl. 179—1.5)

This invention is concerned with communication systems and the like wherein ground noise and various interferences are largely minimized. An extremely wide dynamic range as between pianissimo and fortissimo passages of high-quality broadcast programs may for instance be faithfully transmitted without the risk of overmodulation and without the need for manual monitoring.

The invention is applicable to cable transmission and to various methods of modulating a carrier wave or medium, and furthermore to recording systems. Its advantages are most noticeable with pulse modulation systems, including television systems with sound and image signals on the same carrier wave, which on the very high frequency bands offer many advantages but at present are usually unable of handling a wide dynamic range unless prohibitive band widths are used in conjunction with extremely stable and accurate timing circuits. Moderate band width may be used in accordance with this invention, and a high average percentage of modulation is ensured, making the systems highly efficient.

Logarithmic or similar volume compression has been used in conjunction with expanders operating in response to the received audio signal; such a system causes severe distortion when control is through an adequately wide range and the time constant of regulation is low; yet a quick level rise cannot be quickly enough taken care of. Transmission of a pilot signal has also been used responsive to the compression carried out by hand and/or automatically; since however the pilot signal varies through a considerable range of voltages it is subject to fading and interferences, and the channel or band width requirements of the complete transmission are frequently doubled; on the other hand since sufficiently quick regulation is essential and distorts the modulation, severe distortion occurs at the reproducer if the time constants and degree of expanse do not at all times agree closely with those at the transmitter and this is extremely difficult.

The invention contemplates the transmission or use of an "audio" signal having its "level" or "scale" adjusted stepwise with negligible or low time constant, and of an auxiliary or control indication or code signal responsive to the said "level" adjustment and assuming one of a few possible values. The desired extremely rapid change is easy to transmit with pulse modulation; a somewhat more gradual change may alternatively be used e. g. with amplitude or frequency modulation or in recording systems, and while in such case the time constants of the regulation circuits should be in agreement they do not affect the normal or steady operation of the system. Operation at three possible levels differing by twenty and forty decibels will usually meet the most severe requirements; a system operating at but two possible levels e. g. differing by 30 decibels is however adequate in many practical instances and substantially less expensive.

The main signal is modified and transmitted over a channel permitting but moderate or low voltage swings e. g. about a mean value corresponding to silence. The transmission of the auxiliary or control signal is largely insensible to interferences. Various systems are set forth for keeping the channel or band width requirements very low. According to a feature of the invention a control effect is automatically derived from the signals to be transmitted or translated and, through the intermediary of a storage process (by the aid, for example, of a trigger chain) is applied to alter the amplitude condition of a plurality of significant signal-wave points in respect of level or scale adjustment. According to another feature the amplitude condition of the signal waves to be translated is scrutinized over a plurality of "future" waveform points, in order that the control effect so derived may be more nearly optimum. According to a feature, one control signal value may denote the operative "level" or scale of a plurality of significant values of the main signal wave. According to a further feature of the invention a control or code signal denoting a change of scale may be derived from the waveform to be translated and utilized at the reproducer to aid in reconstituting the original waveform. The said auxiliary signal may act as a multiplicative factor with reciprocal values of said factor at the transmitter and receiver, e. g. to modify the effectiveness of the signal pulses. The receiver adjustments are made very simple and stable and free from distortions while clicks due to the "level" change-over are avoided by proper design. The invention also proposes various systems for modulating one medium, e. g. carrier wave or recording medium, in respect of both the "main" and "control" signals whereby reliably to ensure the desirable or necessary high order or relative timing thereof; said modulation may be in respect of different characteristics (including different pulse timing modulating one carrier wave). The invention subsidiarily may improve the secrecy of transmission.

In the drawing:

Fig. 1 graphically illustrates the application of the invention to a time division multiplex pulse modulation system comprising eight audio-frequency channels and wherein a ninth the pulse channel is sequentially associated with the auxiliary indications denoting one of three possible "levels," pertaining to said "audio" modulation channels, in accordance with a sub-synchronization scheme;

Fig. 2 is a block diagram of a transmitter operating according to Fig. 1;

Fig. 3 illustrates typical circuit details of the transmitter in Fig. 2; Fig. 3*a* illustrates a modification; Figs. 4*a* to 4*c* graphically show typical pulse forms used in Fig. 3;

Fig. 5 illustrates a receiving system for use with the transmitter in Figs. 2 and 3; Figs. 6*a*, 6*b* show typical gate pulses used in Fig. 5; Fig. 7 shows the relative timing of the delayed "level" signal and of a reference pulse;

Fig. 8 graphically illustrates the operation of Fig. 5;

Fig. 9 shows an alternative receiver circuit;

Figs. 10*a*, 10*b*, 10*c*, graphically illustrate multiplex pulse modulation systems wherein each pulse (or pulse pair) simultaneously transmits the "audio" and "level" signal, the mean channel width requirements of the latter being very reduced;

Figure 13:
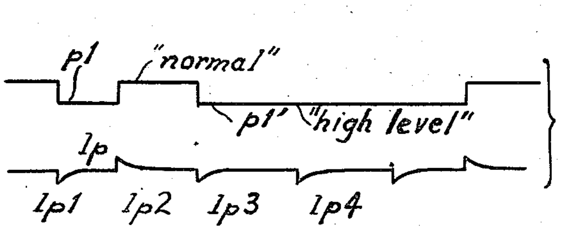

Fig. 13 graphically shows typical "level" control signals.

It will be understood that the features of the invention may be combined or used in a great variety of different systems.

Figures 1, 2, 4A, 4B, 4C, 6A, 6B:
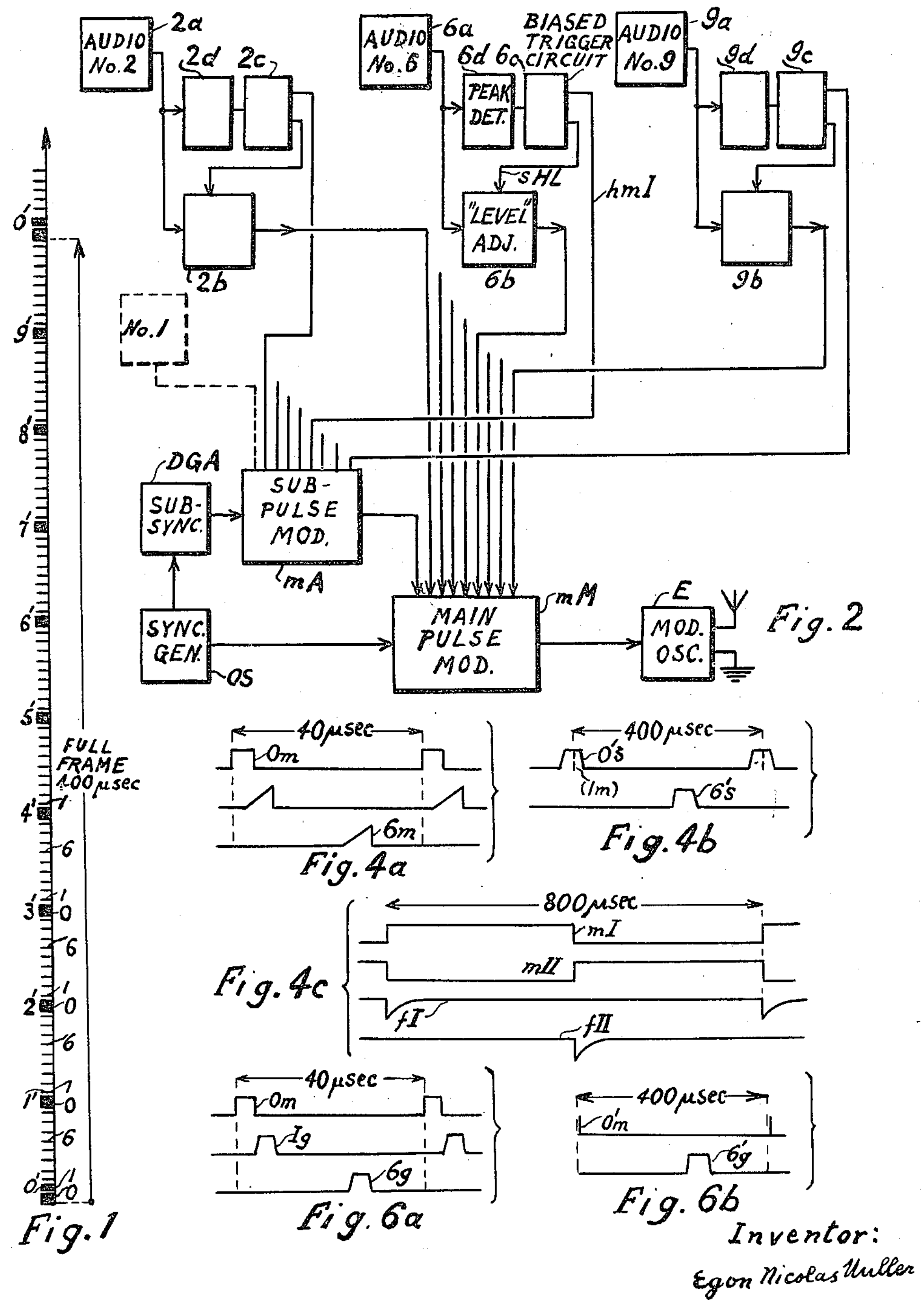

In Fig. 1 multiplex pulses relative to ten channels (including the synchronization pulse) are interlaced; the recurrence frequency is 25,000 C./S. so that each elemental line or cycle of ten pulses has a duration of 40 microseconds; this time for the sake of simplicity may be shared equally among the marker or "sync" pulse numbered 0 and nine channels of 4 microseconds each numbered 1 . . . 9. The eight channels numbered 2 . . . 9 may carry the main signals at suitable "level" of eight high-fidelity audio programs (e. g. by the aid of pulses of modulated duration or of some other well-known character); channel No. 1 which in the instance shown starts immediately after the marker pulse 0 carries the auxiliary or code signals relative to the operative "level" of respectively associated audio programs in accordance with a sub-synchronization scheme which repeats itself after each 400 microseconds.

The first pulse in said channel No. 1 is numbered 0′ and serves as a "sub-sync" pulse; the same may have a duration of less than 3 microseconds to avoid confusion with the main sync pulse (of 4 μsec.). The further pulses in channel No. 1 numbered 2′ . . . 9′ carry the "level" indications relative to the channels respectively numbered 2 . . . 9 (also by the aid of pulses of modulated duration or of some other well-known type not necessarily the same as for the "audio" pulses); sub-channel pulse 1′ is available for auxiliary control purposes and might be further multiplexed by "time-division."

In the transmitter system of Fig. 2 which shows the broad organization only, eight different programs from audio amplifiers 2*a* . . . 9*a* feed individual peak detectors 2*d* . . . 9*d* and converter devices 2*c* . . . 9*c* each including a trigger circuit with two or several points of stable operations. Considering for instance audio channel No. 6, a source of signals to be transmitted (e. g. derived from a microphone through an amplifier) is connected to the rectifier device 6*d* denoted PEAK DET to provide a potential responsive to the amplitude of the signals to be transmitted with respect to a reference axis which is preferably the alternating-current axis. This potential over lead *st* is connected to the properly biassed triggered device 6*c* for making operative a predetermined output value or values among two or several possible ones in response to the detected audio swing. As further explained hereinafter each peak detector device and/or converter device is associated with a storage system maintaining these values in operation during a full sub-synchronization frame of 400 μsec.

These stored and triggered indications over leads such as *s*HL are utilized to control the instant "level" of the original audio signals derived through the respective amplifier devices 2*b* . . . 6*b* . . . 9*b* adjustable to one of two or several predetermined values of relative signal attenuation thereby to avoid overload of the pulse modulator etc., and by leads such as *hm*1 are also fed to device *m*A e. g. in the form of or after conversion to a stepwise changing potential adapted to assume one of two or several characteristic amplitude values; if there are but two operative levels the same step-wave potential (or potentials of mutually reversed polarities may be derived over leads *s*HL, *hm*1. Said device *m*A is an auxiliary modulator-distributor of a character well-known per se in the art of pulse-modulation e. g. of the rotating electronic beam type or having ten tubes made operative in sequence. Details of a suitable embodiment of the latter variety are set forth hereinafter with reference to Fig. 3. (Input No. 1′ is optional and may be connected to a desired source of auxiliary or monitoring indications or potentials e. g. selected by hand.)

The modified "audio" signals over leads such as *a*6 are applied to modulate the channels 2 . . . 9 of the main multiplex distributor-modulator *m*M which is synchronized through the main sync generator OS having a recurrence frequency of 25,000 C./S. Channel No. 1 of this main modulator-system *m*M (of any type sufficiently well known per se e. g. broadly similar to *m*A) is modulated by or with proper timing combined with the output of the aforementioned auxiliary distributor *m*A as further explained hereinafter by way of example with reference to Fig. 3; device *m*A which is synchronously operated with a recurrence frequency of 2500 C./S. derived from the main sync generator through a sub-generator and frequency divider DGA. The main modulated pulses are interleaved with the marker O and fed to the transmitter E.

Figure 3:
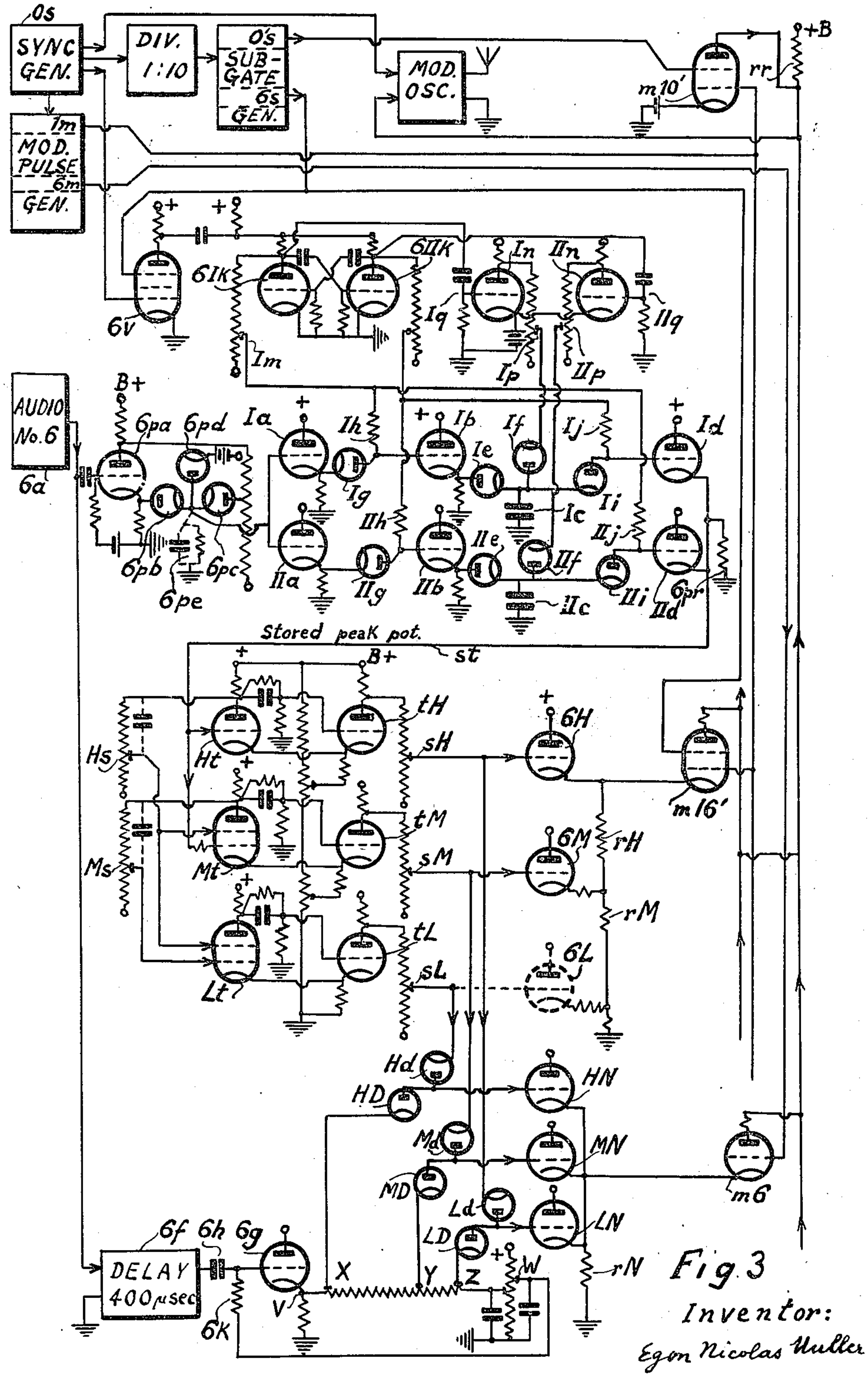

Details of typical circuits for providing the stored and triggered indications responsive to the audio swing, for alternating the audio "level" and transmitting an indication relative to the operating level are shown in Fig. 3. A single program channel 6*a* . . . is shown, being understood that the others are organized in similar fashion.

The "main" and "auxiliary" modulator-distributors by way of example may utilize amplifier tubes made operative in turn by means of modulating or gate pulses of a character well-known per se. For the details of a modulator-distributor system of this kind producing width-modulated pulses with leading-edge modulation, reference may for instance be had to the description of the "Details of Army Wireless Station No. 10" in "Wireless World," issue of June 1946, pages 187–190. The generator system for the main modulating pulses MG is coupled to the sync generator OS and provides positive going pulses suitable for modulating the leading pulse edge; in Fig. 4*a* the pulses 1*m* and 6*m* serving for channels 1 and 6 respectively are shown by way of example, in relation to the marker pulse O*m* (which was numbered 0 in Fig. 1).

The generator of sub-gate pulses GA is coupled to a frequency divider DA fed from the main sync generator system OS to make only each tenth main pulse effective at the output, and provides positive going pulses of 25 microseconds' duration, say, for instance of broadly trapezoidal shape. Pulses 0′*s* and 6′*s* shown by way of example in Fig. 4*b* permit the insertion of the sub-sync pulse 0′ (in Fig. 1) and of sub-channel pulse 6′.

The main modulating pulses 6*m* . . . may control the grid potential of modulating tubes *m*6 . . . having their cathode potential controlled by the "audio" signals of channel 6*a* . . . (over lead *a*6) to produce variable-duration pulses. Pulse 1*m* is applied to the control grid of a further series of modulating tubes *m*16′ . . . having their cathode controlled by the auxiliary ("level") indications derived from channels 6*a* . . . (over leads such as *hm*1), coincidence-control being performed by applying the sub-gate pulses 6′*s* . . . to the suppressor grid so as to either permit normal operation of the modulator tube or to paralyze the same; as shown by the dotted lines in Fig. 4*b* these sub-gate pulses are coarsely centered about one of the modulating pulses (1*m*). The modulating tube *m*10′ controlled by modulating pulse 1*m* and sub-gate pulse 0′*s* may have its cathode at a fixed potential such as to define a sub-sync pulse 0′ (Fig. 1) of 2.5 μsec. duration, say (i. e. shorter than the main marker pulse 0*m* of 4 μsec. but longer than the "level" responsive pulse.

The anodes of all the modulating tubes *m*6 . . . have a common anode load resistor *rr* also included in the anode circuit of tube *m*10′ and if desired of tubes *m*16′ . . . and the thus combined interlaced duration-modulated pulses after combination with the main sync pulse 0*m* serve to modulate the transmitter E.

As considered in detail hereinafter there is provided an audio swing detector having its output associated in turn with storing condensers, and a non-storing trigger circuit converting the peak potential stored by the operative one of the two condensers into three potentials (as at *s*H, *s*M, *s*L) keyed on or off only and into a stepwise altered modulating potential *hm*1.

The audio swing detector comprises a phase inverting tube 6*pa* and diodes 6*pb* and 6*pc* providing push-pull rectification.

Tube 6*pa* is fed by way of a condenser and grid leak and has cathode and anode load resistors, the latter associated with a potentiometer connected to a negative potential −50 with respect to ground for tapping off a suitable fraction of anode A. C. voltage. The effective gain at the cathode and tap is approximately (+1) and (−1) and the steady cathode and tap potentials are approximately at ground potential. Tube 6*pa* of course might be replaced by a transformer. The junction of the diodes 6*pb*, 6*pc* at any time is at a potential higher than or equal to the said steady potential; a further diode 6*pd* limits the positive voltage rise to a predetermined value to avoid overload of the subsequent stages and if desired to provide non-linear response of the output potential.

This junction is connected to two cathode followers I*a* and II*a* respectively connected to a reservoir condenser I*c* or II*c* through a further follower I*b* or II*b*. These reservoir condensers are charged and discharged in alternate order and are indirectly connected to a further follower I*d* or II*d* having a common load resistor 6*pr* connected to the "utilization" device through line *st*. Condenser I*c* for instance is charged during a full frame of 400 microseconds to approximately the peak rectified potential, being in the meantime disconnected from the utilization device; during the next full frame it is operatively associated with the utilization device but disconnected from the swing rectifier or charging circuit and operates as a storage device preserving its potential unchanged by being in substance devoid of discharging resistors. Condenser II*c* is charged and discharged 400 microseconds later.

Charging of the condenser I*c* (II*c*) is through a diode I*g* (II*g*) connected to the cathode follower I*b* (II*b*) capable of impressing a relatively positive going potential only but non-conductive for relatively lower charging potentials and during the discharging and utilization cycle; discharge is through diode I*f* (II*f*) for abruptly restoring the condenser potential to ground or some other low potential before a new charging cycle is effective but non-conducting during the charging and utilization cycles.

The alternate switching of the followers ahead of and past the condensers is by the aid of diode potentiometers I*g*—I*h* (II*g*—II*h*) and I*i*—I*j* (II*i*—II*j*) operatively connected to control points I*m*, II*m* derived from multivibrator tubes I*k*, II*k* having mutually coupled anodes and grids and generating roughly square-shaped pulses as shown at *m*I—*m*II in Fig. 4*c*; synchronization is by means of negative going pulses from the anode circuit of coincidence tube 6*v* and injected across a common anode load resistor portion. The cathode of tube 6*v* is at a suitable positive potential, the main grid is fed with positive going sync pulses from generator OS and the suppressor grid is fed with positive going pulses 6'*m* from generator GA which while roughly centered about one of the main pulses No. 1 are very broad and include therefore the main marker 0*m* occurring a few microseconds earlier. The anode load resistors of tubes I*k*, II*k* through a suitable tapped potentiometer provide the switching points I*m*, II*m*, one tapping at a time being negative with respect to ground while the other is at a higher positive potential than the rectified and limited "audio" voltage.

Discharge of either reservoir condenser occurs quickly at the end of the "utilization" period and before the new charging cycle is effective by the aid of a potential pulse derived from the tap I*p*, II*p* of a potentiometer associated with the anode resistor of amplifier tube I*n*, II*n* fed from the anode circuit of the multivibrator tube I*k*, II*k*, through a differentiating circuit I*q*, II*q*; the cathode of tube I*n* and II*n* is sufficiently positive to normally ensure cutoff, and the taps I*p*, II*p* are normally at a low potential to make the discharging diode I*f*, II*f* normally non-conducting.

The differentiated potential when positive-going briefly makes tube I*n* (or II*n*) operative thereby reducing the tap potential at I*p* (II*p*) to about ground potential to make diode I*f* (II*f*) conducting for some ten or twenty microseconds, starting with the marker pulse which follows the utilization cycle.

The operating potentials at taps I*f*, II*f* are shown at *f*I, *f*II in Fig. 4*c*.

The stored potential over lead *st* controls a multiple trigger system with three pairs of tubes H*t*—*t*H, M*t*—*t*M, L*t*—*t*L responsive respectively to high, medium and low audio peak potentials (e. g. between the limits 0–3, 3–30 and 30–300 volts, the last-named value in effect limited to 35 volts through diode 6*pd*). Lead *st* is connected to the main grid of the left-hand tubes H*t*, M*t*, control of L*t* being unnecessary, input resistors if desired limiting the flow of grid current.

The cathodes of each trigger tube pair are connected via a common feed-back load resistor of moderate resistance to positive potentials tapped off from a potentiometer connected across the high-tension supply to provide echelon threshold bias; each left-hand tube has its anode coupled to the right-hand tube grid through a condenser and potentiometer resistor. Normally the right-hand trigger tubes tend to be operative and the left-hand tubes (excepting L*t*) tend to be cut off; but as the control potential of lead *st* rises, tubes M*t* and H*t* may successively become operative. It is usually preferred to have a single left-hand tube operative at any time, by causing the operative tube responding to the highest threshold to cut off the tubes responding to a low threshold thus forming what might be referred to as a "spearhead" circuit. To this end the anode loads of tubes M*t*, H*t* are each associated with a potentiometer, the tap M*s* controlling the main grid of tube L*t* while tap H*s* controls the suppressor grid of the tubes M*t* and L*t*. Normally the taps M*s*, H*s* are approximately at ground potential, but become substantially negative as the associated anode carries current to excess-bias the grids of tubes M*t*, L*t*.

The right-hand tubes *t*H, *t*M, *t*L have each an anode load resistor associated with a potentiometer the taps *sh*, *s*M, *s*L of which serve as control points for system changing the audio "level" described hereinafter.

Normally they tend to be at a negative potential but become moderately positive when the anode of the corresponding left-hand tube draws current as aforesaid. The taps *s*H, *s*M, *s*L also control the modulator tube *m*16' which transmits the "level" indication and they are to this end connected to cathode followers 6H, 6M (and possibly 6L) associated with a cathode load resistor network providing a constant total load for each tube, an echelon useful portion being included in the modulating path *hm*1; (tube 6L may however be replaced by a suitable steady bias). As will be further apparent hereinafter one follower at a time is operative and thereby assumes a predetermined cathode potential but according as it is 6H or 6M (or 6L) the whole or a moderate (or negligible) fraction of this potential is effectively in the outgoing path *hm*1.

Since a single "level" indication is transmitted during a full frame of 400 microseconds and should take into account the peak audio swing during this period and since at the receiver it should precede the audio signal pulse series to permit simpler circuit design while at the transmitter it may only be reliably detected at the end of this period, the audio signal from amplifier 6*a* is passed through a delay network 6*f* providing a delay of about 400 microseconds (consisting for instance of a sufficient number of low-pass sections).

The delayed audio voltage may be applied to a cathode follower 6*g* through condenser 6*h*, the grid leak 6*k* being connected to a suitable positive potential W, the cathode in the unmodulated condition being at a corresponding positive potential V; and a high-resistance potentiometer with suitably adjusted taps X, Y, Z connects the cathode to a suitably adjusted positive potential Q equal to potential V.

The A. C. components of the audio voltage at taps XYZ are as the ratios 1/1, 1/10, 1/100, tap X being near the cathode and tap Z near point Q.

The tapped audio voltages are applied to or withheld from the grids of cathode followers HN, MN, LN, by the aid of diode potentiometers H*d*—HD, M*d*—MD, L*d*—LD associated with the aforesaid control points *s*H, *s*M, *s*L, the junction being connected to the grid of the associated follower.

The followers have a common output load resistor *r*N connected to modulator tube *m*6, one at a time being thus made operative and all having the same gain (e. g. nearly unity). It will be noted that the steady output potential across *r*N is independent from the adjustment of the taps.

The operation of the system in Fig. 3 as a whole is as follows: Suppose that during a previous odd full-frame of 400 microseconds, after condenser I*c* had been discharged through diode I*f*, a certain peak audio potential was impressed across condenser I*c* through follower I*a*, diode I*g*, follower I*b* and diode I*e* which latter maintains the peak charge, diodes I*f* and I*i* being non-conducting. As the even full frame starts tap I*m* is "low" while tap II*m* is "high"; accordingly tube I*b* is excess-biased through resistor I*h* (diode I*g* being non-conductive), making diode I*e* non-conductive too; diode I*f* is in its normal non-conducting condition through tap I*p*; diode I*i* is conductive and follower I*d* is operative, whereby the potential of lead *st* is defined by the peak charge of condenser I*c* and controls tubes H*t*, M*t*, said charge leaking only inappreciably over resistor I*j*.

Suppose the potential of *st* is somewhat in excess of 30 volts (in the instance given) and thus slightly exceeds the operative threshold of tube H*t*, causing it to draw some anode current. The resultant lowered grid potential of tube *t*H lowers the flow of cathode current due to tube H*t* until tube H*t* carries heavy anode current and tube *t*H carries no longer anode and cathode current. Tapping *s*H thus being at a "high" potential makes diode L*d* non-conducting and diode LD conductive, applying the small audio voltage fraction at tapping Z to audio tube LN which defines the signal pulse width at modulator tube *m*6; by controlling the time of tube conduction when modulation pulse 6*m* is applied to the grid of this tube; taps *s*M, *s*L being at the "low" potential make diodes HD, MD non-conducting and diodes H*d*, M*d* conducting to excess-bias tubes HN, MN. Simultaneously normal cathode current due to tube 6H flows through resistor *r*H, *r*M and over lead *hm*1 raises the cathode potential of modulator tube *m*16' to a high value as compared with the pulsed grid potential thus ensuring the transmission of relatively narrow pulses in the auxiliary signal channel due to brief flow of anode current in response to the application of modulation pulse 1*m* on condition that coincident application to the second control grid of sub-gate 6'*s* permits normal tube operation as explained hereinbefore.

The operation of the system is thus independent from the initial amount by which the threshold of tube H*t* happened to be exceeded, and remains unchanged during the whole of the even 400 microseconds period since the potential of lead *st* remains almost unchanged and any small drop would be taken care of by the backlash of trigger pair H*t*—*t*H.

As the next full frame of 400 microseconds starts condenser II*c* through diode II*i* will define the new potential of lead *st* which may for instance happen to assume a potential lower than the threshold of tube H*t* (which owing to backlash is somewhat higher than the initial value, but the difference by a suitable design may be kept small). Valve H*t* therefore draws less anode current and ceases to bias tube *t*H beyond cutoff; this in turn causes the flow of some cathode current which further biases tube H*t* thus causing a further rise of the grid potential of tube *t*H until tube *t*H draws heavy anode current and ceases to make audio tube LN operative, while tube H*t* is biased to cutoff and ceases to paralyze tubes M*t* and L*t*. Tube M*t* thus becomes operative and in turn through tap *s*M makes audio tube MN operative and simultaneously adjusts the bias of the "level" responsive modulator tube *m*16' through resistor *r*M.

Reliable operation of the trigger circuits may be eased if the response curve at the output of the peak rectifier is designed to have a progressive limiting or saturation characteristic.

Alternatively the same cathode bias may serve for tubes H*t* and M*t* along with a ten times higher stored control potential for tube H*t*, there being for instance provided two different D. C. amplifiers (associated with limiters) in connection with lead *st*.

The circuit in Fig. 3 during each full frame of 400 microseconds adjusts the highest possible "level" of audio transmission avoiding overmodulation so that different "audio" wave portions may frequently happen to be transmitted at different "levels"; this actually forms a kind of secrecy signal.

While this minimizes to the utmost noise due to interferences, shot effect, inaccurate timing of the pulse circuits etc. it is liable in the event of inaccurate "level" adjustments to introduce some noise of its own due to switching clicks. Whereas this may be reduced by a reduction of the (average random) rate at which switching may take place it is however arranged preferably that the change toward a relatively lower "audio level" remains instantaneous; (isolated peaks might be limited as usual); the change toward a high "audio level" on the other hand may be delayed for a certain time substantially in excess of 400 microseconds during which high audio peak values must be absent. To this end a resistor may be inserted in series with diodes I*f*, II*f* whereby the peak-responsive condenser charge will drop only moderately at the discharging instant which precedes the charging period. Alternatively leakage of the storage condenser charge may occur during the "charging" period of 400 microseconds by connecting the seriesed discharging diodes I*f*, II*f* to tappings II*m*, I*m*, the tubes I*n*, II*n* being dispensed with.

Figure 3A:
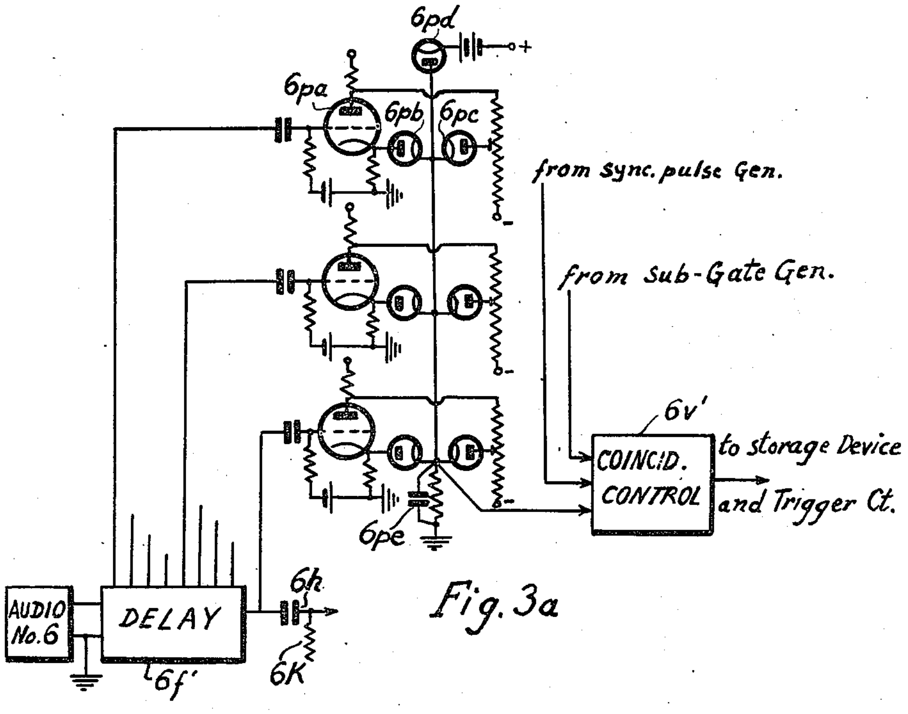

A comparatively high discharging time constant such as 1/100 second may ensure that the charge due to a high audio peak occurring at the beginning of the 400 microseconds charging cycle will not have leaked appreciably at the end of this cycle (to avoid the resultant reduction of peak handling capacity of the modulator). A low time constant may alternatively be used as shown in Fig. 3*a* in conjunction with a plurality of rectifying diode pairs 6*pb*1—6*pb*2 . . . fed with audio signals delayed by different amounts staggered between zero and 400 μsec., e. g. derived from taps of delay line 6*f'* similar to 6*f* above through individual inverters 6*pba* or transformers. Up to ten such diode pairs may be provided in conjunction with the shunted reservoir condenser 6*pe* of low time constant, to thereby permit the detection of the true audio peak value throughout the 400 μsec.-period at the brief instant of the marker pulse 0 which precedes sub-channel pulse 16' (see Fig. 1) which carries the "level" indication corresponding to said value; the remaining circuit elements may thus be substantially simpler. It will be understood that storage of the peak indication instead of by a reservoir condenser or condensers may be by other means such as a multiple trigger circuit or circuits which may or may not use resetting and may be generally similar in design and function to those described with reference to Fig. 5 hereinafter. The reservoir condenser 6*pe* may be connected thereto at the brief instant of occurrence of marker pulse 0 which precedes the "level" pulse 16' by the aid of coincidence control device 6*v'* (Fig. 3*a*) similar to 6*v* in Fig. 3.

Figure 7:
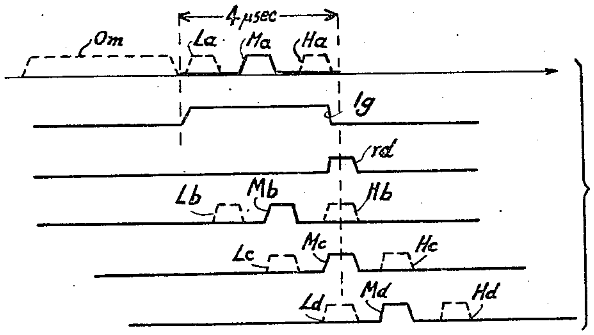

Whereas for the sake of simplicity the circuit was so far described with reference to a typical and well-known type of duration-modulation it will be obvious that other types of modulated pulses may as well be generated. The pulses of tubes *m*16' . . . denoting the "level" indication may for instance be converted into pulses modulated as to "position" (time of occurrence), as by differentiation and clipping, before combination with the "audio" pulses. Easier synchronization may thus be ensured since a sub-sync pulse of moderate width may serve (distinguishable easily from both the main marker pulse and the short position-modulated pulses). In Fig. 7 a modulated pulse of 0.5 μsec. is shown in the "medium-level" position at M*a*, positions H*a* and L*a* denoted by the dotted lines respectively corresponding to high and low detected audio peaks.

(The main marker pulse might have a strictly predetermined leading edge time of occurrence and the sub-sync pulse might be of longer duration or of the same duration and acolated thereto.)

Figure 5:
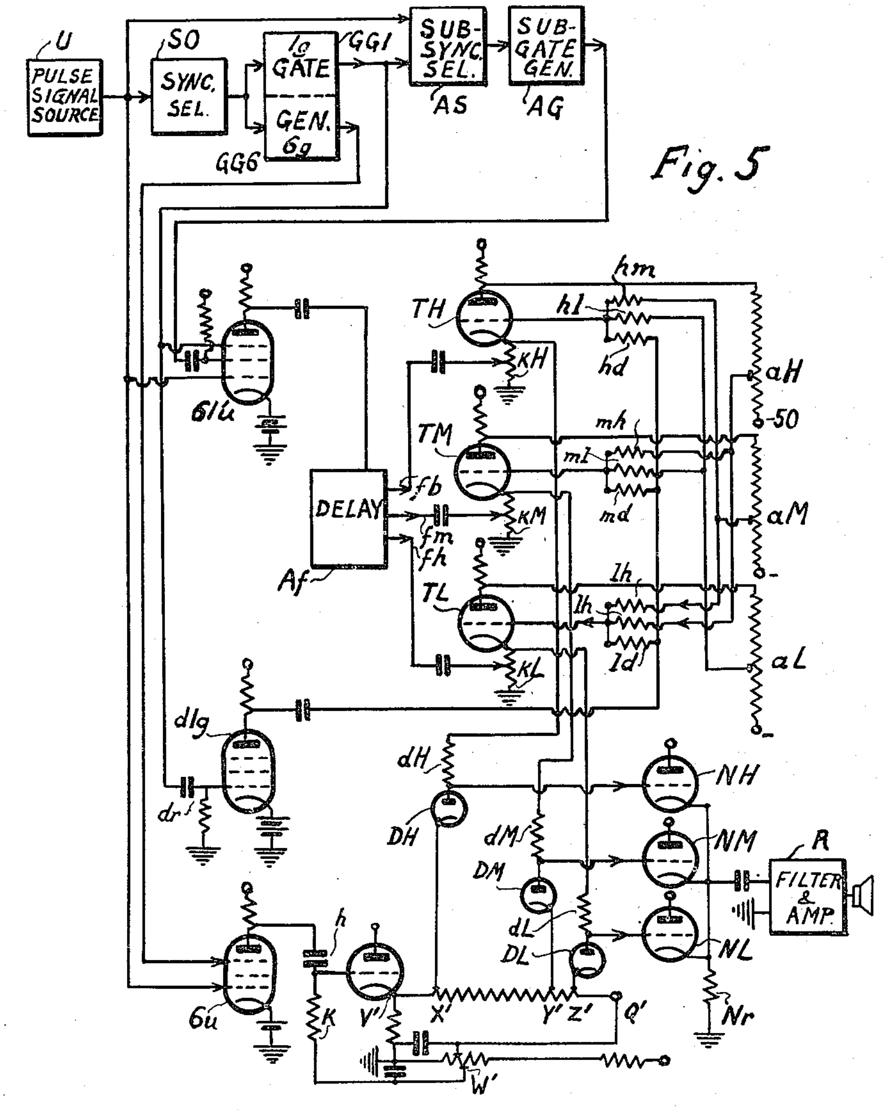

Referring now to Fig. 5, a typical receiver circuit comprises a main signal amplifier-rectifier U providing positive-going pulses and connected to a marker pulse selector SO which is coupled to the generators GG1 and GG6 of gate pulses providing positive-going pulses 1*g* and 6*g* shown in Fig. 6*a* and serving for channels 1 and 6 respectively.

The signal pulses from source U and the gate pulses 1*g* are applied to a coincidence amplifier and sub-sync pulse selector AS for selecting the sub-marker pulse 0'*s* in channel No. 1 which at generator AG controls the timing of sub-gate pulse 6'*g* indicated in Fig. 6*b* in relation to sub-sync pulse 0'*m* (and which is similar to sub-gate pulse 6'*s* at the transmitter).

The indication denoting the transmitted "level" is stored during a full frame of 400 microseconds, serving in the meantime to adjust the effective level of the "audio" pulses. Transmission is supposed to be as a position-modulated pulse, the time of occurrence being the earlier the lower the audio peak at the transmitter (see Fig. 7), being compared with an accurately timed reference pulse which in the circuit shown is the trailing edge of gate pulse 1*g*. Storage and control of the "level" adjustment is by the aid of a trigger circuit having three positions of stable equilibrium and including tubes TH, TM, TL corresponding to high, medium and low "audio level" at the receiver (i. e. to high, medium and low peaks at the transmitter), interconnected in ring formation to ensure that one tube at a time stays operative. Resetting prior to the storage of a new level indication is not required with the circuit shown, and the selected (i. e. appropriate) tube is triggered at the beginning of the 400 microseconds period in response to four coincidence conditions derived from coincidence tube 61'*u* and from amplifier *d*1*g* and injected in the cathode circuit and the grid circuit respectively of the trigger tubes. Each trigger tube has an anode load resistor associated with a potentiometer having a tap *a*H, *a*M, *a*L, respectively, which is either at a substantial negative or positive potential with respect to ground, according as the anode does or does not conduct current. The grid of each trigger tube is connected to the tap of the two other tubes, for instance through decoupling resistors *hm*, *hl* . . . which may be associated with diodes to reduce the loss of sensitivity, in a manner known in the art; thus the anode tap of the tube which happens to be conducting biasses beyond cutoff the two other tubes.

The cathode of each trigger tube is connected e. g. to ground, via a cathode load resistor, and over leads *k*H, *k*M, *k*L operates the level adjustment, each cathode being either at ground or at a moderate positive potential according as the trigger tube conducts current or not. Coincidence tube 61'*u* is of the pentode type, the signal pulses being applied to the main grid, the gate pulse $1g$ to the suppressor grid and the sub-gate pulse $6'g$ to the screen-grid, the cathode being at a suitable positive potential normally ensuring cut-off bias. (Tubes with a higher number of electrodes might of course be designed or used to facilitate the proper operation of the control electrodes.)

The anode load resistor is connected to a delay-line $Af$ of about 0.5, 2 and 3.5 microseconds delay, there being to this end three output tappings $fh$, $fm$ and $f1$ which via coupling condensers are connected to the cathode circuits of the tubes TH, TM and TL respectively.

The reference pulse shown at $rd$ in Fig. 7 is positive-going, of about .5 microsecond duration and derived from the anode circuit of tube $d1g$ having the main grid connected via the differentiating circuit $dr$ to the generator GG1 of gate pulse $1g$ (also shown in Fig. 7), whereby the tube normally draws rather heavy anode current which on the occurrence of the positive grid swing due to the leading pulse edge is not appreciably changed but which is briefly upset as the grid swings negative on the occurrence of the trailing edge of pulse $1g$.

This reference pulse via resistors $hd$, $md$, $1d$ and/or condensers, or diodes, is injected simultaneously in the grid circuits of the three trigger tubes. In Fig. 7 this reference pulse is shown in relation to the echelon timing of a signal pulse $Mb$ . . . $Mc$ . . . $Md$ at the taps $fh$, $fm$, $f1$, one of these necessarily ensuring coincidence. As explained hereinafter the different positions (timing values) of pulse $Ma$ denoting level are shown in full lines, those relative to $La$, $Ha$ being shown in dotted lines. The audio signal pulses are derived from the anode circuit of gate tube $6u$ simultaneously controlled by the signal source U and by gate pulse $6g$, and may be applied to the grid of a follower $g$ through a condenser $h$ of large capacitance associated with the grid leak $k$ ensuring a high time constant, and connected to a point W′ defining a predetermined steady cathode potential V′; tapping W′ as shown may be associated with a by-pass condenser. A high-resistance potentiometer with taps X′, Y′, Z′ connects cathode V′ to point Q′ adjusted to assume the same potential as V′ in the absence of a signal or preferably in the presence of signal pulses corresponding to "silence." The taps X′, Y′, Z′ through diodes DH, DM, DL are connected to followers NM, NL, LH having a common output resistor $Nr$, resistors $d$H, $d$M, $d$L between the grid and the control points $k$H, $k$M, $k$L ensuring that in substance a single follower operates at any time, the others carrying negligible cathode current.

The audio signal pulses of correct "level" across $Nr$ are applied to a low-pass filter and amplifier R associated with the reproducer.

The circuit shown for adjusting the audio level is substantially similar to the circuit at the transmitter, it being understood that when the transmitter via tap X (Fig. 3) adjusts a high level (1/1) the corresponding gain level at the receiver (via tap Z′) is low ($1/100$) and vice versa, the resultant attenuation or signal amplitude being constant. The operating conditions are somewhat different at the receiver in that the duration-modulated signal pulses of follower $g$ have a positive going portion of substantial amplitude separated by negative going portions of broadly nineteen times lower amplitude but nineteen times longer duration; owing to the high time constant $h$-$k$ the operation is substantially independent from changes in the duration of individual pulses due to the audio modulation or caused by "level" adjustment at the transmitter, since the positive and negative portions are only averaged over a substantial fraction of a second and the voltage tapped off at X′, Y′, Z′ has both the positive and negative swings reduced in the same proportion.

By proper adjustment of tap Q′ no distortion will occur if the "audio" pulses instead of being truly rectangular have somewhat sloping edges and are for instance of trapezium shape.

The operation of the trigger circuit and "level" control circuit is as follows:

Suppose that tube TH was made operative previously; its cathode is at a non-critical moderate positive potential such as +12 volts, making diode DH conductive and audio tube NH operative; the grid of TH is at a slightly lower positive potential such as +10 volts defined mainly by the taps $a$M and $a$L (both at somewhat higher potential). The anode of TH is at a reduced positive potential due to heavy current flow and tap $a$H therefore is at a substantial negative potential which lowers the grid bias of tubes TM, TL to a sufficient low potential such as −13 volts to ensure rather heavy cut-off. The cathode of TM, TL being at ground potential makes diodes DM, DL non-conducting so that the audio tubes NM, and NL draw negligible cathode current. Pulses from tube $d1g$ will repeatedly be injected in the grid circuit of the trigger tubes, effectively raising the grid potential by 5 volts so that the operative bias of tubes TM, TL may be lowered from −13 to −8 volts, and it is arranged that this bias value still is beyond the cutoff point so that the condition of the trigger system remains unchanged.

On the other hand a pulse from tube $61'u$ at different instants may be injected in the cathode circuit of the trigger tubes to lower the cathode potential briefly to −5 volts so that the operative bias of TM, TL may again be −8 volts i. e. beyond the point of cutoff.

Now suppose that a new "level" signal pulse is received ($Ma$ in Fig. 7) which is to make tube TM operative. Since this pulse is injected in the cathode circuit of TM at the same time as the reference pulse from tube $d1g$ is injected in the grid circuit—due to proper delay-timing as at $Mc$—tube TM will briefly conduct current. The resultant potential drop at tap $a$M as applied to the grid of tube TH via resistor $hm$ reliably and causes tube TH to conduct less heavily; this in turn raises the potential of tapping $a$H hence via resistor $mh$ of the grid of tube TM and causes heavier conduction until tube TM is fully conductive and continues to do so after the triggering impulses have vanished, making audio tube NM operative while tube TH continues to be non-conducting owing to excess-bias through tap $a$M.

Figure 8:
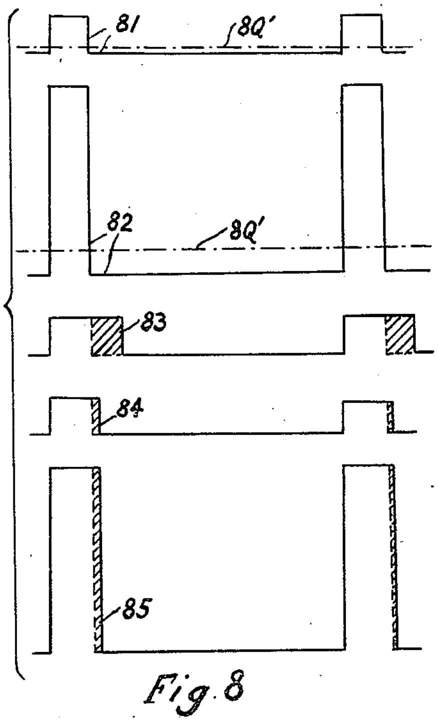

Fig. 8 illustrates a few typical operating conditions of the circuit in Fig. 5, the pulses shown being not exactly to scale. Pulses 81 and 82 correspond to the steady state at the transmitter and receiver (e. g. in the no-signal condition at the transmitter), being derived at points Y′ and X′, say; they have different swing values and the instantaneous potential oscillates in balanced fashion about a mean potential shown at 8Q′ by the broken line which is the potential at Q′; the pulses have a moderate width. Pulses 83 and 84 correspond to a high instantaneous audio voltage at the audio source of the transmitter; pulse 83 is transmitted at high level (i. e. relatively high depth of modulation) using transmitter tap Y (Fig. 3), say being denoted by a very long pulse, and may be derived for utilization from tap Y′; pulse 84 is transmitted at a lower level (i. e. relatively low width or depth of modulation) and is only slightly longer than the reference pulse 81, and accordingly is derived for utilization at a comparatively high amplitude, from tap X′, as shown at 85. It will be seen that the difference in surface between pulses 83 and 81 on one hand and 85 and 82 shown by the shaded areas and corresponding to useful audio voltage variation at the output is the same i. e. the local higher swing causes the same effect as the longer duration during transmission. A pulse limiter of conventional type of course may be used ahead of the potential divider structure (ahead of tube $g$, say) to hold the pulse level constant (at 81, 83, 84 etc.).

The system is also applicable when amplitude-modulated pulses are transmitted in which case an increased local amplitude may exert the same effect as a decreased remote amplitude; a limiter of course cannot be used, and the mean level or swing of the pulses is preferably regulated and held substantially constant by a automatic gain control circuit of sufficiently long time constant of regulation, at the input of follower $g$.

According to a modification of the circuit in Fig. 5 the reference pulse may be incident earlier than the auxiliary signal pulse and may be derived in response broadly to the trailing edge of the main marker pulse e. g. from a suitable point in the marker selector SO having an integrator circuit and sufficiently high threshold bias; same may be injected as a positive going pulse responsive to said reference pulse and of selected echelon delay in the individual grid circuit of the three trigger tubes by the aid of a tapped delay line similar to $Af$, the output of coincidence tube $61'u$ being simultaneously (i. e. without the aid of tapped delay-line $Af$) injected in the three cathode circuits. Injection of the different pulses of course might also be by transformers.

The trigger circuit in Fig. 5 is easily modified for use with duration-modulated pulses responsive to the "level" indication which after selection or coincidence control through gate pulse 1g and sub-gate pulse 6'g, differentiation, clipping and possibly phase reversal yield two separate pulses responsive respectively to the leading and trailing edges, of which the former is associated with the trigger tubes through the tapped delay line and the latter directly.

If the "level" indication is transmitted as a amplitude-modulated pulse it may be stored in a reservoir condenser with resetting through the gated marker pulse 06' (i. e. pulse 0*m*, effectively applied jointly with sub-gate pulse 6'*s*) in conjunction with a trigger circuit as shown in or described with reference to Fig. 3. Condenser storage may alternatively be dispensed with and stable trigger equilibrium positions may be provided either by means of a tripple trigger tube pair as in Fig. 3 (preferably using constant threshold bias but stepwise selected signal pulse amplitudes, using sufficient backlash and resetting through pulse 06'), or by means of a storing trigger circuit in ring formation as shown in Fig. 5 in conjunction with a circuit for feeding the signal of the type referred to as "spear head" circuit in Fig. 3 so that a single tube is fed with a signal pulse.

According to an alternative trigger circuit for use in Fig. 5 the ring interconnection of tubes TH, TM, TL is omitted; each tube may be associated with an individual further trigger tube for maintaining the operative condition brought about by the triggering pulses; or a gas-filled relay-tube may be used in lieu of each such trigger tube pair; or again the triggering pulses may abruptly charge a reservoir condenser optionally through a diode preventing discharging; each of these trigger pairs or relay tubes or condensers is operatively connected to the circuit adjusting one specified audio level. In each of these arrangements a separate resetting or discharging step is provided before the new storage or charging step of 400 microseconds duration starts, as by deriving a pulse responsive to the coincident reception of sub-gate pulse 6' and of the marker pulse 0*m* (preferably derived via an integrating circuit and threshold bias, from sync selector OS) for simultaneous resetting injection in the circuits of all the three trigger valve pairs or to cause the simultaneous discharging of the three reservoir condensers e. g. by the aid of a diode made conductive, or for briefly lowering the anode potential of the relay-tube.

Whereas no manual monitoring was referred to hereinbefore it will be understood that the low transmission level denoting high audio peaks might be adjusted by hand, in advance of a fortissimo passage, say, e. g. by adjusting a potentiometer to define a potential to take the place of potential *st* (Fig. 3) or for super-imposition or injection to lead *st* e. g. through the intermediary of a diode (and resistor in lead *st*) which becomes conducting when the manually selected potential is higher than the automatically defined one.

The circuits in Figs. 3 and 5 may easily be modified for use in connection with a higher number of audio levels than three. On the other hand if only two possible "levels" are used both the transmitter and receiver may be considerably simpler, and the channel transmitting the level indication may assume either of but two possible conditions, the condition requiring low receiver gain being for instance denoted by a "no-pulse" or no-signal condiction and the high-gain position by the presence of a pulse or signal. The two levels in a typical embodiment may differ by 30 decibels.

A typical transmitter circuit may include a single peak detector in turn feeding two storage devices each in the form of a multivibrator tube pair assuming one or other position of equilibrium according as the peak is above or below a substantially predetermined value, and utilized in turn to substantially perform also the function of the condenser storage circuit and of the trigger circuit H*t* . . . in Fig. 3.

Figure 9:
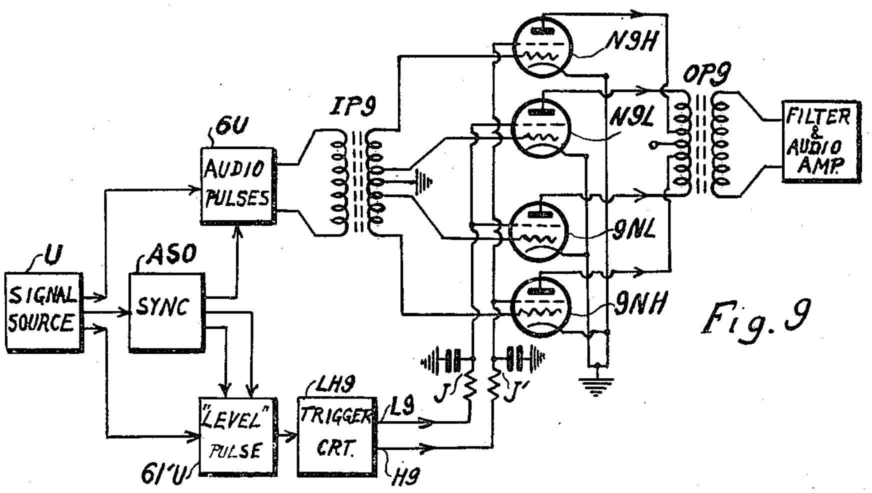

Fig. 9 shows a typical receiver circuit for a two-level system, and subsidiarily illustrates an alternative circuit for altering the "level" of the pulsed "audio" signal.

The signal source U on one hand provides the audio pulses as at 6U and on the other hand the "level" pulses as at 61'U e. g. by the aid of coincidence amplifiers controlled by the synchronized gating pulses from device ASO. The control effect of the pulse denoting level is stored until the audio pulses occur, by the aid of a multivibrator circuit LH9 e. g. comprising a pair of interconnected tubes having two positions of equilibrium respectively defining a high and a low control potential. Control potentials of mutually opposite polarities are derived over leads L9, H9, e. g. through the intermediary of potentiometers associated with the anode circuits of the tube pair. The audio pulse is derived through a push-pull transformer passing a very broad band of frequencies substantially including the pulse component frequencies; the transformer secondary in addition to the normal output tap pair has a balanced intermediate tap pair with about 5 times lower output signal level. These two pairs of output taps are individually connected to the grid circuits of amplifier tubes N9H, 9NH, N9L and 9NL the anode circuits of which are connected to a somewhat similar transformer but with tapped primary, in such a way as to enhance the signal level difference derived through one tube and other by the taps used in cascade so that the signal levels differ by 30 decibels as defined by the transmitter characteristics. The transformer secondary may feed the usual low-pass filter and audio amplifier. Individual low pass filters may optionally be provided for the different pulses, e. g. in the anode circuits of the tubes N9H . . .

One of the tube pairs is keyed on and the other off at any time, as by using tubes with an additional gain control grid, the suppressor grid, say connected to leads L9 and H9 respectively.

The push-pull connection of each tube pair serves to avoid noise due to the switching clicks.

One-shot multivibrators may be used which normally tend to stay in the low-level (low audio gain) position, say, and which on reception of a level pulse denoting the high level assume the second state of equilibrium during nearly 400 microseconds (whereby the level signal may serve for the entire series of associated audio pulses), as by properly dimensioning mutual capacitive coupling of the trigger tube pair at LH9.

Alternatively (and preferably) mutual D. C. coupling may be used at LH9 so that the multivibrator tends to stay indefinitely in either the high-level or low-level condition once the same is established. To this end each time the level-responsive channel 61'U is made operative by properly timed gating pulses thereby to admit the signal pulse, of negative going polarity say, which denotes the level (providing said pulse is present), another pulse of opposite polarity (positive going, say) is generated locally and timed to coincide with the transmitted signal pulse; the two pulses are super-imposed and the (stronger) remote pulse when present effectively reverses the polarity of the resultant trigger pulse as injected in the multivibrator; combined pulses dependent on the resultant polarity imposes one condition of equilibrium or other. The two pulses alternatively may be separately injected at different points of the multivibrator with proper mutual amplitude and polarity so that the remote pulse when present will dominate. The level-responsive gating pulse (possibly resulting from the joint control effects of gate pulses 6 and 1') may serve as the aforesaid local pulse, or in a few instances a slightly delayed pulse corresponding to the leading edge thereof.

At the transmitter a similar circuit may change the "level" of the audio voltages e. g. supplied by device 6*f*.

According to a modification of Fig. 9 the tubes 9NH . . . which may be looked upon as compensating the change in the D. C. operating conditions of the associated tubes N9H . . . may be designed and operated to have at the anode a secondary electron emission factor of 2 to provide at the output load the usual gain but reverse polarity of the signal (as compared with a non-emissive anode); suitably operated pentodes with the output lead off from the screen grid may perform the same function. In either case the output currents of a tube pair (such as 9NH and N9H) may traverse a common anode load resistor; a properly selected-fraction of this resistor may furthermore be traversed by the outputs from another similarly operated tube pair (such as N9L, 9NL, say), transformer OP9 being dispended with. Alternative means for making operative the desired tube may be used e. g. control of the cathode potential through lead H9. . . Three or more tube pairs may be used in connection with three or more levels e. g. controlled by potentials broadly as in Fig. 5. The tubes might all be included in a single envelope; or a special tube might serve having means for projecting a broad stream of electrons along with anodes or targets corresponding to those of tubes N9H, N9L, modulating means operating by intensity control or deflection control in one direction, and deflector means operated by a stepwise altered control potential as at H9 . . . in Fig. 9, or as at *hm*1 in Fig. 3 if more than two levels are used, whereby the electron stream will impinge on the target or targets relative to a single specified level at any time.

The above systems using a tube pair for each level to compensate the D. C. component are very suitable for somewhat more gradual or fade-over switching or alteration of the gain in which case the switching potentials both at the transmitter and receiver may be applied to the associated gain control grids of the tube pairs through a resistance-capacity filter having a predetermined preferably rather small time constant. Accordingly the main audio signal pulses at the transmitter when at a comparatively low level will rather progressively instead of abruptly change over to a comparatively high level although the corresponding level indication or signal may be transmitted immediately i. e. successive audio signal pulses will do so more progressively; conversely at the receiver the auxiliary indication may be stored as in Fig. 5 but may exert its influence progressively; a R-C network of predetermined time constant ($\frac{1}{50}$ of a second, say) may for instance be included for instance in leads H9, L9 in Fig. 9; the switching diode-resistor potentiometers in Fig. 5 might likewise be associated with a delaying condenser. After the transient switching condition is over the time constant of the switching circuits does not exert any further influence.

Figure 10A:
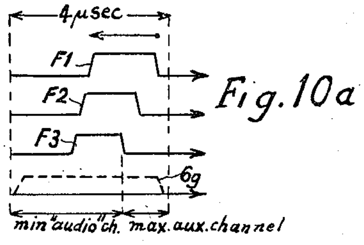

Referring now to Fig. 10*a* each multiplex pulse simultaneously transmits the modified audio signal and the "level" indication. The "audio" signal is transmitted as a duration-modulated pulse, the trailing edge being slightly advanced or retarded in accordance with the "level" indication. Three levels are available in the instance shown, denoted by the interval between said trailing signal edge and the edge of the gate pulse 6*g* timed with moderate accuracy. The pulse widths shown at F1, F2, F3 correspond to the "unmodulated" condition, and it will be observed that the leading edge may be roughly half-way between the channel extremities allotted to the main signal under the prevailing level conditions, the balance of the 4 microseconds channel serving for the "level" responsive interval as at C1, C2, C3 whereby the full channel width may be utilized at any time; this "re-centering" feature in most embodiments will not cause appreciable expense or complicated adjustments.

At the transmitter the duration-modulated "audio" pulse e. g. derived from the output of modulator valve *m*6 in Fig. 3 may be passed through a delay-line having three (or two) taps providing staggered delay of 0, .5 and 1 microsecond which in conjunction with a fixed advance in timing of 1 microsecond of the modulating pulse derived from generator MG provides a resultant advance in timing (with respect to the trailing gate edge at the receiver) of 1, .5 and 0 microsecond denoting for instance low, medium and high audio speaks. Each delay tap is associated with a cathode follower (or amplifier) and with switching means (e. g. similar to the diode potentiometer HD . . . in Fig. 3 or through a suppressor grid) controlled by the taps *s*H, *s*M, *s*L simultaneously with the corresponding "level" adjustment means, these followers having a common output load resistor for modulating the transmitter. The modulating pulse (6*m* in Fig. 4*a*) may be capable of filling the entire channel width, and the audio taps X, Y, Z are associated with individual potentiometers to permit the separate adjustment of three points instead of the single one Q in Fig. 3, defining the mean pulse width denoting "silence"; the A. C. and D. C. adjustments are such as to ensure the proper reference pulse width and maximum swing; in the above instance the audio swing at "X" would be somewhat decreased and the corresponding D. C. potential "Q" slightly raised as compared with the adjustments of "Z." Tubes 6H . . . and *m*16′ . . . in Fig. 3 concerned with the "level" indication may be dispended with. A storage system of low time constant might be used in association with the peak detector; the audio delay network 6*f* might similarly provide reduced delay such as 40 microseconds. According to a modification the tapped delay line and the controlled followers may be associated with the modulating pulse, the effective timing of which as applied to the modulating valve is thus controlled in accordance with the level indication. The amplitude of this pulse might simultaneously be controlled together with the mean level; the audio taps X, Y, Z may thus be derived from a single potentiometer.

The receiver circuit may be broadly similar to the circuit in Fig. 5, the trailing edge of the signal pulse being compared with the trailing edge of the gate pulse 6*g* to trigger the appropriate tube e. g. of a trigger circuit in ring formation; one of the audio tubes NH . . . may thereby be made operative during each full cycle of 40 microseconds and switching of the audio tubes may occur only in the event of a level change so that clicks due to inaccurate D. C. adjustment may be reduced to the utmost. The level responsive signal pulse derived from an amplifier tube controlled by gate pulse 6*g* and by the pulses from the signal source and derived through a differentiating circuit after individual delaying through a tapped delay line similar to A*f* may be injected with proper polarity in the grid-cathode circuits of the trigger tubes which on the other hand are fed simultaneously from a tube similar to *dig*, triggering being in response to the coincident biassing effects. The "audio" signal pulse is derived from the afore-mentioned gated amplifier through a delay network providing a delay of 4 microseconds, say, to take into account the late time of arrival of the "level" indication. The audio potentiometer taps may be similar to X′, Y′, Z′, but derived from individual potentiometers associated with slightly different fixed potentials Q′ . . ., the adjustment being inverse to the transmitter adjustment; since the difference between these potentials is small they may be mutually defined by fixed resistors, there being a single adjustable tap Q′. The foregoing system may be modified to use pulses forming a mirror image of those shown in Fig. 8*a*, the functions of the leading and trailing edges being interchanged, to thus avoid the audio delay of 4 microseconds.

Figure 10B:
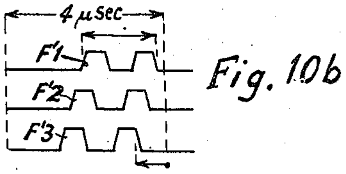

In Fig. 10*b* position-modulated pulse pairs are transmitted. The "audio" signal is derived as a function the interval between the "first" and "second" pulse F′1 . . . and C′1 . . . respectively; the second pulse C′1 denotes one of e. g. three possible levels, its timing being compared with the timing of the trailing edge of the gate pulse. As in Fig. 10*a* the total channel width of 4 microseconds may again be fully utilized under any prevailing level condition. At the transmitter the pulse pair may for instance be derived from the duration-modulated pulses in Fig. 10*a* by superimposing differentiated and limited pulses of both polarities in a common output circuit and further clipping to obtain steep narrow pulses. A typical receiver circuit may include a trigger tube pair made "operative" through the "first" pulse, a coincidence amplifier responsive more particularly to the "second" pulse, and a trigger circuit with three positions of stable equilibrium operated in response to the coincident effects of a reference pulse and of the properly delayed "second" pulse. The trigger tube pair has a common cathode resistor and the anode circuit of the normally inoperative left-hand tube besides being coupled to the right-hand tube grid also provides duration-modulated audio pulses. This tube is triggered into operation in response to the joint effects of pulses from the signal source and from the gate generator. The positive going pulses from the anode of the right hand trigger tube, as current is cut off, is applied to the suppressor grid of the afore-said coincidence amplifier having the main grid fed from the signal source. The coincident output which is negative going and solely responsive to the "second" signal pulse through a delay line (similar to A*f* in Fig. 5) having three taps may be coupled to the cathode circuits of the multiple trigger circuit and on the other hand is injected in the grid circuit of the left-hand trigger tube to restore it to the "inoperative" condition. A small condenser in the suppressor circuit if desired associated with a diode ensures full effectiveness of the "second" pulse before the coincidence amplifier is cut off again by the right-hand trigger tube. The level of the audio pulse may be adjusted through the triple trigger circuit as in Fig. 10*a*.

Figure 10C:
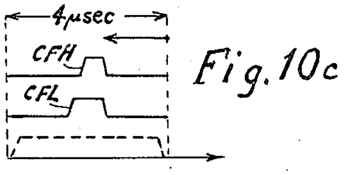

In Fig. 10*c*, a (multiplex) pulse modulated as to position through the "audio" signal is simultaneously modulated in duration in accordance with the level indication. Two levels are available in the instance shown, pulses CFH and CFL having a duration of .5 and 1 microsecond respectively; the trailing edge may occur with predetermined timing. At the transmitter a position-modulated pulse of .5 microsecond duration may be fed to a delay line providing .5 microsecond delay (if desired having taps); the thus delayed output signal derived through a follower or amplifier serves to "normally" (i. e. while there are but low audio peaks) modulate the transmitter. The direct pulse (together possibly with the intermediate delayed pulses) is selectively super-imposed by the aid of a follower with diode switch or by a blockable amplifier or like electronic switch, the load resistor being in common with that of the above follower or amplifier, and switching being through the intermediary of the "level" responsive potential e. g. from control tap *s*H in Fig. 3, simultaneously with the adjustment of the audio adjusting circuit. Switching may occur at the beginning of a 40 microseconds period e. g. during the transmission of the sync pulse. The two (or several) contiguous or overlapping pulses of .5 microsecond duration each are clipped to yield the single broad pulse of 1 microsecond duration. The .5 microsecond delay of the trailing edge of the signal of course may be taken into account by advancing the modulating pulse through .5 microseconds. The "audio" pulse might be "re-centered" as set forth with reference to Figs. 10*a*, 10*b*.

At the receiver the "audio" pulse may be derived as a duration-modulated pulse from a multivibrator triggered through the joint effects of the gate pulse and of the differentiated and limited and possibly inverted signal pulse, to ensure response to the trailing edge only. The "level" indication may be derived from a storing multivibrator circuit whereof one tube or other is made operative in response to the coincident injection of the aforesaid differentiated signal responsive to the trailing edge and of another differentiated and limited signal pulse ensuring response to the leading edge derived through a tapped delay line with delays of .5 and 1 microsecond respectively, the arrangement being similar to that in Fig. 5. No switching of the level adjusting system will occur between successive signal pulses unless the level is changed. The audio pulse may be delayed by a minute amount.

Alternatively the differentiated signal pulse responding to the leading pulse edge only may be delayed through 0.5 microsecond and injected in the storing multivibrator to tend to make it "inoperative" (i. e. denoting the low level condition); a second pulse is derived from the anode circuit of a coincidence amplifier fed from the signal source and with said pulse responsive to the leading edge serving as a gate pulse, and is injected in the multivibrator circuit with sufficient amplitude and such polarity as to overpower said first pulse and ensure the "operative" (i. e. high-level) condition, the arrangement being similar to that in Fig. 9.

Another alternative receiver circuit involves converting the signal pulse denoting level by modulation in duration into a variable-amplitude pulse by the aid of an integrating circuit which is associated with a threshold bias adjusted to be just exceeded by a pulse lasting about .75 microsecond (whereby it will reliably respond to CFH but not to CFL), which is then injected with proper polarity in the storing multivibrator circuit with a substantial amplitude; a pulse of moderate amplitude responsive to the leading edge of signal is on the other hand injected with a slight delay and tends to impose the low-level condition, being overpowered by the pulse denoting high level. Since the correct multivibrator condition may be ensured before the incidence of the trailing signal pulse edge no delay of the "audio" pulse needs to be used.

It will be understood that the present method of pulse transmission is also suitable in connection with audio pulses further converted at the transmitter and reconstituted at the receiver by methods known per se to thereupon serve for amplification as set forth hereinbefore.

The invention is particularly useful as applied to television systems wherein the audio signals are transmitted on the same carrier wave as the video signals e. g. by means of pulses transmitted during the fly-back periods between successive image-line scans or inserted in blanking spaces correlated to the usual synchronization pulses.

In accordance with one class of systems each "audio" signal pulse may be associated with an individual "level" signal pulse. Two adjacent pulses may for instance be transmitted properly timed with respect to a marker pulse also serving for the image synchronization, in accordance with a time division multiplex scheme. The "level" indication preferably precedes the "audio" pulse so that storage or delay of the latter at the receiver may be dispended with. This "level" indication may be stored, e. g. by one-shot multivibrators until the audio pulse is over, or until an indication denoting a different "level" is received e. g. by means of a multiple trigger circuit having several positions of stable or semi-stable equilibrium, e. g. as in Fig. 5 or broadly as set forth hereinbefore. The means for ensuring the properly timed blanking spaces and inserting the pulses are sufficiently well understood by those skilled in the art.

Figure 11:
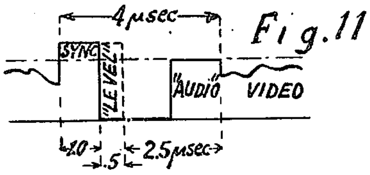
Fig. 11 illustrates a television system wherein the "level" indication is inserted between or combined with the synchronization and audio pulses, a common carrier wave being used.

In the arrangement illustrated in Fig. 11, the "audio" pulse is duration-modulated; a high and a low gain may be adjusted at the receiver in response to the presence or absence of a pulse CH in the auxiliary channel of .5 microsecond width which immediately adjoins the sync pulse e. g. of 1 microsecond duration. The sync pulse has a higher amplitude than the black level of the video signal denoted by the broken line, and the level pulse as shown may be looked upon as a lengthened sync pulse with constant leading edge time; it might alternatively have the same amplitude as the audio signal which as shown corresponds to black level. At the transmitter the level pulse may be inserted by means of the level responsive potential e. g. from lead *s*H in Fig. 3 in a blanking space timed to adjoin the sync pulse or in the instance shown the sync pulse may be modulated stepwise as to duration through said level responsive potential. At the receiver a differentiated, delayed and limited pulse caused by the leading edge of the sync pulse selected by virtue of its high amplitude may be injected in a storing trigger circuit e. g. as at LH9 in Fig. 9 along with an overpowering level pulse derived from the source of signals while using again said pulse as a gate pulse. Alternatively the high-amplitude pulse as shown denoting the level permits an arrangement wherein the delayed pulse caused by the leading edge of the sync pulse is used jointly with the integrated and biased lengthened sync pulse shown of overpowering amplitude; or again the leading and trailing edges of the lengthened sync pulse shown may be compared through a tapped delay-line, these circuits all being broadly as set forth with reference to Figs. 9 and 10*c*. A system with positive video modulation may alternatively be used, the "high-level" condition being denoted by carrier suppression during the interval allotted to the level channel, along with the prolonging carrier suppression defining the sync pulse blanking; the "low-level" condition may be denoted by a small carrier amplitude corresponding to black level preceding the audio pulse; the receiver circuits may be broadly as in the foregoing arrangements, all polarities being reversed.

In accordance with another class of arrangements a single level indication may define the level of a plurality of audio pulses for instance of all the pulses occurring during a television image field or frame. The storage system may comprise multivibrators with stable positions of equilibrium, or reservoir condensers using resetting etc., as shown in or described with reference to Figs. 5, 3, 9. Preferably the "level" indication is transmitted between two successive "audio" pulses, being confined to the duration of a single television line or a portion thereof. A time division multiplex scheme may be used, there being provided blanking properly correlated with the usual frame synchronization pulses; a level pulse may be inserted e. g. to adjoin each frame sync pulse whereby at the receiver the latter derived as usually readily permits the production of a properly timed gate pulse for selecting the "level" pulse, the converse arrangement serving at the transmitter.

This invention is also useful in systems wherein the "audio" and "level" signals are transmitted permanently over separate channels, including multiple modulation forms or sub-carriers of a single carrier or medium.

At the transmitter the peak rectified potential, e. g. from across condenser 6*pe* in Fig. 3 providing the desired sluggish response to low peak values may directly operate the trigger circuits Ht . . ., the modulation denoting "level" being derived from lead *hm*1 or possibly from the distinct potentials *s*H . . . The audio delay line 6*f* if desired may be small. At the receiver a multivibrator with suitable threshold may be used e. g. as in Fig. 3, or Fig. 9, minimizing the effects of fading and interferences on the "level" signal; alternatively clipping of this signal may be used, in particular with two-level systems to provide predetermined output values. Preferably the transmitter and receiver use somewhat gradual level changeover, to take into account channel limitations of the "level" signal.

Figure 12:
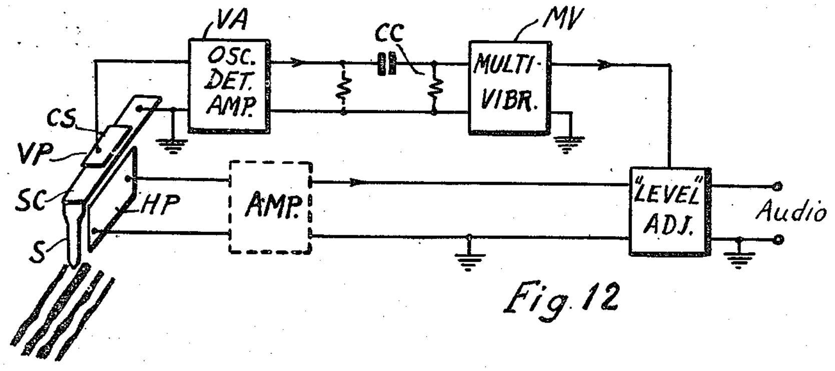
Fig. 12 illustrates a typical recording system.

The invention applies to various systems for recording the modified audio signals supplied by the "transmitter," along with the indications denoting "level," and for utilizing these signals at a desired time or repeatedly, by a pick-up device including, the circuits hereinbefore described as pertaining to the "receiver." Recording may for instance be on film or tape or the like with two adjacent parallel tracks each associated with a separate recording or pick-up means properly and invariably correlated mechanically. A preferred arrangement uses mechanical recording on disc or tape with a single groove, the recording or reproducing stylus being responsive separately and simultaneously to a recorded horizontal signal component e. g. for the "audio" signal and to a vertical signal component e. g. for the "level" indication. Fig. 12 illustrates more particularly a composite pickup head and the associated reproducer circuits; since the composite recorder and associated circuit elements may be quite similar it is believed that they may properly illustrate the recorder as well, having regard to the description hereinafter. Two levels are preferably used, providing a substantially increased dynamic range and playing time, the grooves being spaced closely. The pick-up head as is customary in many of the more recent constructions using lateral stylus motion may comprise a flat compliant member SC supporting or coupling the stylus S, and having high lateral stiffness to provide adequate audio signal output at HP of well-known character in response to the lateral stylus motion while ensuring high undesired spurious vertical compliance to minimize the vertical "signal" due to "level-change" indication or the influence of disc irregularities or the like, the slower vertical changes being taken up by a low vertical inertia of the pick-up head as a whole along with ball-bearing pivoting thereof. As will readily be understood and as will become further apparent hereinafter said "lateral" element HP is designed to leave some reasonably discrete emplacement space for the vertical structure VP considered hereinafter, this condition being easily fulfillable with various of the well-known constructions. The compliant piece SC on the other hand as at VP provides a separate vertical signal (of a type set forth hereinafter) and to this end may act as the moving condenser electrode (or coupled to an auxiliary condenser electrode) co-operating with a fixed condenser electrode in front spaced a small distance, the resultant variable condenser being included in a circuit VA of well-known type to frequency-modulate an auxiliary generator. Alternatively the compliant piece SC may cooperate with a small auxiliary magnetic structure of well-known character arranged so as to avoid interference with the normal or audio pick-up structure; or again the compliant piece might serve to drive a small auxiliary piezo-electric cartridge structure. In either case the vertical signal may have a low amplitude, and the low-frequency components thereof are not transferred as by using condenser coupling as at CC, which passes the components of higher frequency which in substance may define a saw-tooth pulse denoting a change of level (as illustrated in the bottom part of Fig. 13). The recording system may be designed in similar fashion. The signal to be recorded denoting level e. g. from a storing multivibrator assuming either of two positions of equilibrium instead of being continuously present as at *p1m* in the top part of Fig. 13 may be converted into a series of pulses, being for instance derived through a resistance-capacity coupling having a time-constant of 1/30 second, say, whereby a change of the level potential may yield a saw-tooth pulse with an abrupt front and progressive tail, said front corresponding to increased or to decreased stylus depth according as the audio signal is changed over to a lower or higher "level," and the normal record depth corresponding to *mn* in Fig. 13 being thereafter resumed. These depth changes may be sufficiently small as not to interfere with the lateral stylus variations. At the reproducer the resultant positive or negative pulse may operate a trigger tube pair denoted MV in Fig. 12 e. g. as set forth with reference to Fig. 9 operating the converse level adjustment. To minimize erroneous response (e. g. caused by a defective groove spot), the vertical recording system may utilize an appropriately adjusted multivibrator (positioned as at MV) whereby repeated saw-tooth pulses 1*p*3, 1*p*4 . . . (Fig. 13) may be generated during each high-level period *pl'* of "level" indication; at the receiver the first pulse of the series (as at 1*p*3) will cause appropriate triggering of the storing multivibrator MV to bring about high "receiver" gain, the further pulses (1*p*4 . . .) having no effect (except if accidental and faulty response to the low-level condition occurred) so that unnecessary switching is avoided.

I claim:

1. The method of low-noise or secrecy translation of complex signal wave forms which includes deriving a control effect responsive to the condition wherein the amplitude of the signal wave portions to be translated exceeds a threshold value and utilizing said control effect for automatically adjusting the relative attenuation or magnification of signal portions as translated and with a certain means approximation in respect of a total plurality of more than 2 possibly selectable or distinguishable amplitude-values to one of two predetermined definite values.

2. The method of low-noise or secrecy translation of complex signal wave forms which fluctuate about a reference axis adapted to be looked upon as denoting a no-signal condition, which includes deriving a control effect responsive to the condition wherein the amplitude of signal wave portions to be translated exceeds a threshold value, and utilizing said control effect for automatically adjusting the relative attenuation or magnification of signal portions as translated also as measured from said axis to one or other of two predetermined definite values said signal portions being with a certain mean approximation in respect of a total plurality of more than 2 possibly selectable or distinguishable amplitude values.

3. The method of low-noise or secrecy translation of complex signal wave forms fluctuating about a reference axis which includes deriving control effects responsive to the conditions wherein the amplitude of signal wave portions to be translated as measured from said axis in either direction is comprised between two successive ones among a series of echelon threshold values and utilizing said control effects for automatically adjusting the relative attenuation or magnification of signal portions as translated also measured from said axis to the corresponding one among a number of predetermined stepped values broadly corresponding to the intervals between successive threshold values the signal-portions so translated being with a certain mean approximation in respect of a total plurality of more than 2 possibly selectable or distinguishable amplitude values.

4. The method of low-noise or secrecy transmission of audio signal waves which includes comparing the amplitude of wave portions to be transmitted as measured from the alternating-current axis with a reference voltage and deriving a stepped control voltage in response to the condition wherein said wave amplitude exceeds said reference voltage amplitude; utilizing said control voltage for automatically adjusting the relative attenuation of the signal portions as transmitted also as measured from said axis to one of two predetermined definite relative values the signal portions thus adjusted being with a certain mean approximation in respect of a total plurality of more than 2 possibly selectable or distinguishable amplitude values, transmitting said signal portions at the thus adjusted level and concurrently transmitting an indication denoting the presence or absence of said control voltage.

5. The method of low-noise or secrecy transmission of audio-frequency signal waves which includes comparing the amplitude of wave-portions to be transmitted as measured from the alternating-current axis with a series of echelon reference voltages and deriving a stepped control voltage responsive to the conditions wherein said amplitude is comprised between two successive ones of said voltages, utilizing said stepped control voltage for automatically adjusting the relative attenuation of the signal wave-portions as transmitted to one of a plurality of predetermined values broadly corresponding to the intervals between successive reference voltages the signal portions thus adjusted being with a certain mean approximation in respect of a total plurality of more than 2 possibly selectable or distinguishable amplitude values, and in substance concurrently transmitting an auxiliary signal responsive to said stepped control voltage.

6. The method of signal transmission set forth in claim 5 further characterized in that said echelon reference voltages correspond to signal amplitudes in relatively predetermined proportions ratios and in that corresponding values of said stepped control voltage as transmitted differ by substantially predetermined increments.

7. The method of signal translation set forth in claim 2 further characterized by the step of clipping a control voltage, said voltage being derived in response to the condition specified and the clipped voltage performing the control effect set forth.

8. The method of transmission of complex signal waves which comprises deriving signals through a first or control path and comparing the amplitude of said signals with echelon reference voltages thereby effectively classifying the total range through which changes of instantaneous signal amplitude may occur into two or more sub-ranges; deriving a control effect responsive to the ordered numeration of the operative sub-range; deriving signals through a second or main path, delaying the transfer of signals through said second path, automatically adjusting the operative signal level in said second path in accordance with the said control effect the signal portions thus adjusted being with a certain mean approximation in respect of a total plurality of more than 2 possibly selectable or distinguishable amplitude values, and transmitting the thus adjusted or modified main signals by initiating the change-over from one predetermined value of attenuation to another by the aid of said control effect; and substantially concurrently transmitting an indication in response to the value of said control effect.

9. The method of signal transmission set forth in claim 8 further characterized by the steps of generating auxiliary pulses spaced a substantial period of time as compared with the changes in significant values of elemental wave fractions of the said main signals, and modulating said pulses in accordance with said control effect.

10. The method of signal transmission claimed in claim 8 further characterized by the steps of deriving a plurality of sets of signals through a plurality of control paths, delaying said signals within their respective paths by echelon amounts and deriving a control effect responsive to that one of said sets of signals which has the relatively highest amplitude, for comparison as aforesaid.

11. The method of signal transmission claimed in claim 10, further characterized by the steps of storing said control effect over a certain period of time and operating signal level adjustment as aforesaid in response to said stored effect.

12. The method of signal transmission claimed in claim 8 further characterized by the steps of separately storing at decalated time-intervals control effects as aforesaid, and in alternate time order deriving therefrom the operative control effect applied for the aforesaid level adjustment.

13. The method of multiplex time division signal transmission which includes transmitting a plurality of complex signal waves individually modified or adjusted in accordance with claim 8, generating a plurality of interlaced series of recurrent pulses, modulating some of said pulse series with the aforesaid modified signal waves, and in sequential order with a relatively lower rate of recurrence modulating successive pulses of a further one of said series of pulses with the respective auxiliary level indication.

14. The method of signal transmission claimed in claim 8 further characterized by the steps of generating and of modulating a series of uniformly recurrent pulses in accordance with said modified main signals using a sampling process.

15. The method of signal transmission claimed in claim 8 further characterized by the steps of generating a series of uniformly recurrent pulses, modulating said pulses in respect of one of their characteristics with said main modified signals, and modulating said pulses in respect of another of their characteristics with said auxiliary indication denoting level.

16. The method claimed in claim 15 further characterized in that said pulses have constant amplitude.

17. In the receiving system of a low-noise or secrecy communication system, the method of signal translation which includes deriving a first kind of signal denoting audio wave portions at a suitably pre-adjusted level as measured from the alternating-current axis, deriving a second kind of signal denoting the condition of one of at least two definite relative level pre-adjustments respectively and with a certain mean approximation in respect of a total plurality of more than 2 possibly selectable or distinguishable amplitude-values of the wave-portions of said signal of the first kind; deriving a stepped wave control potential in response to said second signal, and automatically adjusting the relative magnification or attenuation of said signal of the first kind to one of a corresponding number of at least two values which are inversely in accordance with the relative aforesaid level values, through said control potential.

18. In a receiving system using the method according to claim 17 wherein said first signal is at one or other of two definite predetermined levels and wherein said control potential is derived by the absence and presence respectively of a pulse of relatively predetermined amplitude and polarity, said method furthermore including the steps of locally generating a subsidiary pulse of similar timing characteristics but reverse polarity and relatively low amplitude in comparison with the transmitted pulse, and combining said two voltage pulses.

19. The method of reception of low-noise or secrecy signals according to claim 17 wherein said second signal is received with time shift with respect to said first signal, including the step of relatively delaying one of said signals to restore time concordance, and operating adjustment of and by the thus relatively delayed signals.

20. The method of reception of low-noise or secrecy signals according to claim 17 wherein said signals are sampled being in the form of modulated pulses with relative mutual timing shift, further characterized by the step of storing an indication responsive to said second signal.

21. The method of reception of low-noise or secrecy signals according to claim 17 wherein said signals are sampled being in the form of modulated pulses, further characterized by the steps of deriving said signals of the first type in the form of modulated pulses of variable duration and constant amplitude, and of automatically adjusting the operative level of said pulses as aforesaid.

22. A low-noise or secrecy signal translation system of the character set forth having a primary source of complex signal waves, means for producing pulsating control signals which at any time denote one of N significative values, N being at least 2, transfer means coupled to said source adapted for transferring said signal waves at N possible conditions of signal transfer representing definite relatively predetermined values of magnification or attenuation, with means for making operative a preselected one of said conditions in agreement with the operative value of said control signals and with a certain mean approximation in respect of a total plurality of more than 2 possibly selectable or distinguishable amplitude-values of the signal-wave portions thus translated and transferred, means for modulating a utilization medium by the thus modified signal waves, and means for substantially concurrently modulating said medium by said control signals; and reproducer means adapted for substantially restoring the original values of the signal waves comprising means for deriving from said medium said modified signal waves and said control signals respectively, and means for automatically making operative the converse condition of signal transfer of said derived signal waves with reciprocal relative values of magnification or attenuation in accordance with said derived control signals.

23. In a low-noise or secrecy signal translation system of the character set forth, a transmission system having means for deriving complex signal waves, means for producing pulsating control signals which at any time denote one of N operative values, N being at least 2, transfer means coupled to said source adapted for transferring said signal waves at N possible conditions of signal transfer representing definite relatively predetermined values of magnification or attenuation, with means for making operative a preselected one of said conditions in agreement with the operative value of said control signals and with a certain mean approximation in respect of a total plurality of more than 2 possibly selectable or distinguishable amplitude-values of the signal-wave portions thus translated and transferred, means for transmitting a first series of modulated pulses comprising means for generating pulses recurrent in a predetermined sequence and means for modulating same in accordance with the modified signal waves at the output of said transfer means, and means for concurrently transmitting a second series of modulated pulses comprising means for generating regularly recurrent pulses and for modulating same in accordance with said control signals.

24. In a signal translation system of the character set forth, transfer means adapted for transferring complex signal waves at N possible conditions of signal transfer representing definite relatively predetermined values of magnification or attenuation; means for deriving pulsating control signals as a function of the amplitude of said complex signal waves including $(N-1)$ comparing circuits provided with threshold voltages of operative echelon values each adapted to provide a control effect when an applied voltage to be measured exceeds the associated threshold value; means for applying to each of said circuits a voltage denoting the same instantaneous signal wave amplitude, including a common source of complex signal waves, and means for automatically making operative a preselected one of said transfer conditions in accordance with the joint control effects derived from said comparing circuits.

25. In a signal translation system of the character set forth having means for deriving main signals representing complex signal waves, and means for deriving pulsating control signals denoting N possible operative values, transfer means adapted for transferring said main signals at N possible conditions of signal transfer, comprising N transfer paths each representing a definite predetermined value of magnification or attenuation, electronic switching means in each of said transfer paths, means for applying said main signals to the input of each of said transfer paths, means for combining the outputs of said transfer paths, and means for controlling said switching means in response to said control signals.

26. A signal translation system according to claim 25 adapted for the transfer of main signals fluctuating about a reference axis, characterized by the provision of a potentiometer means at the input of said transfer channels connected between said means for deriving main signals and a fixed potential supply corresponding to said reference axis potential, said potentiometer having a plurality of taps respectively associated with said switchable transfer paths.

27. In a signal translation system of the character set forth, a source of complex signal waves, transfer means adapted for transferring complex signal waves at N possible conditions of signal transfer representing different values of predetermined and definite magnification or attenuation, N being at least 3, means for producing pulsating control signals as a function of the amplitude of said complex signal waves comprising means adapted to provide N control effects effective one at a time including $N-1$ comparing circuits provided with threshold voltages of operative echelon values respectively adapted to provide a first control effect when an applied voltage to be measured exceeds the associated threshold value and a second control effect when it is below said value, with means for nullifying said first control effects in response to said second control effects pertaining to a relatively higher threshold value; means for applying to each of said circuits a voltage derived from said source denoting the same instantaneous signal wave amplitude, and means for automatically making operative a preselected one of said transfer conditions in accordance with the joint control effects derived from said comparing circuits.

28. A signal translation system according to claim 25 further characterized in that each of said transfer paths comprises two branching paths provided with switching means and respectively having their inputs and outputs in opposed phase relationship; and means for simultaneously controlling the switching means of said two branching paths.

29. A signal translation system for complex signal waves comprising, means for developing stepwave control signals at any time assuming one of at least two possible operative values, means for applying said control signals to signal wave transfer means, said transfer means comprising electronic adjusting means whereby to make operative a preselected one of at least two possible conditions of magnification or attenuation in accordance with the operative control signal value, electric differentiator means for producing isolated control signal pulses assuming one of two possible values in agreement with said stepwave signals to denote changes thereof, and utilization means coupled to the output of said transfer means and to said control signal pulse producing means respectively.

30. The method of transmission of complex signal waves which comprises, producing pulsating control signals which at any time denote one of N operative values, N being at least 2, adjusting the transfer of signal waves to a preselected one of N conditions of magnification or attenuation in accordance with the operative control value, and transmitting composite modulated pulse trains each including a control pulse indication in respect of a single operative control signal value and a group of main pulses representing a plurality of significant values of said adjusted signal waves over a time interval substantially extending from the time of occurrence of said pulse indication up to the next pulse indication of the next composite train.

31. In a signal translation system for complex signal waves of the character set forth, means for deriving pulsating control signals as a function of the amplitude of said complex signal waves over a time interval during which same assumes a plurality of instantaneous amplitude values and denoting one of N possible control values, including an electronic comparing circuit system adapted for deriving a control effect when an applied voltage exceeds an operative threshold value, and means for applying to said circuit system a voltage applied as aforesaid, derived from said complex signal waves in accordance with the peak instantaneous amplitude over said time interval; means for delaying said complex signal waves during said interval; means for storing said control effect; signal wave transfer means coupled to the output of said delaying means provided with means for automatically adjusting a preselected one of N possible signal transfer conditions denoting definite magnification or attenuation in accordance with the control effect derived from said storing means, and utilization means coupled to the output of said transfer means and to said control signal deriving means respectively.

32. A low-noise or secrecy signal translation system of the character set forth having a source of complex signal waves, means for producing pulsating control signals which at any time denote one of N possible values, N being at least equal to 2; signal transfer means coupled to said source associated with electronic actuating means whereby to adjust in stepwise manner a preselected one of N possible conditions representing different values of definite and predetermined magnification or attenuation of the transferred signals, in conjunction with means whereby to operate said actuating means in response to the operative value of said control signals, thereby to cause the transferred signals to assume with a certain mean approximation a plurality of possible values in excess of 2; and utilization means coupled to the output of said transfer means and to said control signal producing means respectively.

33. A low-noise or secrecy signal translation system of the character set forth having means for deriving main signals denoting with a certain mean approximation complex signal waves at a suitably preadjusted scale of amplitudes and capable of assuming a plurality of possible or distinguishable values in excess of 2, means for concurrently deriving pulsating control signals capable of assuming N possible operative values denoting said scale of amplitudes, N being at least equal to 2, signal transfer means coupled to said main signal deriving means associated with electronic actuating means for adjusting in stepwise manner a preselected condition out of N possible conditions representing different values of definite and predetermined attenuation or magnification of the transferred signals; means whereby to operate said actuating means in response to the operative value of said control signals, and utilization means coupled to the output of said signal transfer means.

34. A low-noise or secrecy signal translation system of the character set forth having means for deriving main signals denoting complex signal waves, means for deriving control signals capable of assuming N possible operative values denoting the scale of amplitudes of said complex signal waves, N being at least equal to 2, signal transfer means coupled to said main signal deriving means associated with electronic actuating means whereby to adjust a preselected condition out of N possible conditions representing different values of definite and predetermined magnification or attenuation of the transferred signals, means associated with a circuit of predetermined time constant whereby to operate said actuating means in response to the operative value of said control signals, and utilization means coupled to the output of said signal transfer means.

35. A low-noise or secrecy signal translation system of the character set forth having means for deriving main signals denoting complex signal waves preadjusted at intervals of time as to the scale of amplitudes, means for deriving pulsating control signals capable of denoting N possible operative values representing said scale of amplitudes, N being at least equal to 2, means for storing said control signals during operative intervals of time whereby the operative value thereof may be held substantially unchanged while said main signals may undergo changes in significant value, signal transfer means coupled to said main signal deriving means associated with electronic actuating means whereby to adjust a preselected condition out of N possible conditions representing different values of definite and predetermined attenuation or magnification of the transferred main signals, means whereby to operate said actuating means in response to the operative value of said stored control signals during said operative intervals of time, and utilization means coupled to the output of said signal transfer means.

36. The method of low-noise or secrecy transmission of complex signal waves which includes, deriving a plurality of signal values adapted to represent characteristic signal amplitudes with specific echelon values of delay, deriving control effects from the respective signal values in respect of characteristic echelon amplitude values thereof, making ineffective those control effects representing relatively low amplitude values in response to the occurrence of an operative control effect denoting a relatively higher amplitude value, utilizing said operative control effect for automatically adjusting the operative value of magnification or attenuation of transfer of a main signal representing said complex signal waves to one of a plurality of echelon values in accordance with the said control effects, and concurrently transmitting indications in respect of said main signal as transferred and of said operative control effect.

References Cited in the file of this patent

UNITED STATES PATENTS

| | | |
|---|---|---|
| 1,590,362 | Gibson | June 29, 1926 |
| 1,623,600 | Jammer | Apr. 5, 1927 |
| 1,726,578 | Nyquist | Sept. 3, 1929 |
| 1,734,219 | Lorance | Nov. 5, 1929 |
| 1,916,187 | Read | June 27, 1933 |
| 1,990,414 | Newby | Feb. 5, 1935 |
| 2,025,388 | Henning | Dec. 24, 1935 |
| 2,105,916 | Harrison | Jan. 18, 1938 |
| 2,114,471 | Keller | Apr. 19, 1938 |
| 2,200,559 | Mitchell | May 14, 1940 |
| 2,272,613 | Phelps | Feb. 10, 1942 |
| 2,332,782 | Crosby | Oct. 26, 1943 |
| 2,405,280 | Bedford | Aug. 6, 1946 |
| 2,407,259 | Dickieson | Sept. 10, 1946 |
| 2,429,608 | Chatterjea | Oct. 28, 1947 |
| 2,449,467 | Goodall | Sept. 14, 1948 |
| 2,458,566 | Cox | Jan. 11, 1949 |